(12) United States Patent
Lange

(10) Patent No.: US 12,738,786 B2
(45) Date of Patent: Sep. 15, 2026

(54) ROTOR FOR AN ELECTRIC MACHINE

(71) Applicant: Dr. Ing. h.c. F. Porsche Aktiengesellschaft, Stuttgart (DE)

(72) Inventor: Johannes Lange, Dettenheim (DE)

(73) Assignee: DR. ING. H.C. F. PORSCHE AKTIENGESELLSCHAFT, Stuttgart (DE)

( * ) Notice: Subject to any disclaimer, the term of this patent is extended or adjusted under 35 U.S.C. 154(b) by 264 days.

(21) Appl. No.: 18/439,781

(22) Filed: Feb. 13, 2024

(65) Prior Publication Data

US 2024/0275227 A1 Aug. 15, 2024

(30) Foreign Application Priority Data

Feb. 15, 2023 (DE) ..................... 10 2023 103 617.3

(51) Int. Cl.

*H02K 1/32* (2006.01)
*H02K 1/276* (2022.01)
*H02K 15/02* (2025.01)
*H02K 15/12* (2025.01)

(52) U.S. Cl.

CPC ............... *H02K 1/32* (2013.01); *H02K 1/276* (2013.01); *H02K 15/02* (2013.01); *H02K 15/12* (2013.01)

(58) Field of Classification Search

CPC ........ H02K 1/276; H02K 1/2766; H02K 1/32; H02K 15/02; H02K 15/03; H02K 15/12
USPC ............................................................ 310/59
See application file for complete search history.

(56) References Cited

U.S. PATENT DOCUMENTS 8,080,908 B2 * 12/2011 Matsubara ............... H02K 1/32 310/156.53
8,674,574 B2 3/2014 Hayslett et al.
9,030,062 B2 * 5/2015 Matsumoto ............. H02K 1/32 310/58
10,020,706 B2 * 7/2018 Kobes ...................... H02K 1/04
(Continued)

FOREIGN PATENT DOCUMENTS

DE 102009025929 A1 12/2010
DE 102012204782 A1 10/2012
(Continued)

OTHER PUBLICATIONS

Translation of Foreign Patent Document No. DE 102019127583 A1 (Year: 2021).*

*Primary Examiner* — Alex W Mok
(74) *Attorney, Agent, or Firm* — LEYDIG, VOIT & MAYER, LTD.

(57) ABSTRACT

A rotor for an electric machine includes at least one inner sheet package arranged on a rotor shaft defining a rotor longitudinal axis and buried magnets arranged radially around the at least one inner sheet package, which are arranged in a radial direction between the inner sheet package and correspondingly arranged outer sheet packages and fixed by a casting compound. The rotor further includes a plurality of surface magnets arranged on the outer sheet packages, each surface magnet forming a rotor pole in conjunction with a respective one of the outer sheet packages on which it is arranged and at least one of the buried magnets. At least one cooling channel extending along the rotor longitudinal axis is arranged in at least one of the inner or outer sheet packages and is sealed by a casting compound in a medium-tight manner.

17 Claims, 4 Drawing Sheets

(56) References Cited

U.S. PATENT DOCUMENTS

| | | | | |
|---|---|---|---|---|
| 11,469,635 | B2 * | 10/2022 | Dums | H02K 1/2766 |
| 2007/0228858 | A1 * | 10/2007 | Malmberg | H02K 1/2766 310/156.01 |
| 2014/0091651 | A1 * | 4/2014 | Dorfstatter | H02K 3/24 310/58 |
| 2016/0261158 | A1 * | 9/2016 | Horii | H02K 1/32 |
| 2018/0375395 | A1 * | 12/2018 | Yamagishi | H02K 9/197 |
| 2020/0328641 | A1 * | 10/2020 | Dums | H02K 1/32 |
| 2020/0366173 | A1 * | 11/2020 | Walisko | H02K 3/34 |
| 2021/0273506 | A1 * | 9/2021 | Masuko | H02K 1/148 |
| 2022/0399770 | A1 * | 12/2022 | Tardy | H02K 21/14 |

FOREIGN PATENT DOCUMENTS

| | | | |
|---|---|---|---|
| DE | 102017124471 | A1 | 11/2017 |
| DE | 102018222634 | A1 | 6/2020 |
| DE | 102019117686 | A1 | 1/2021 |
| DE | 102019117691 | A1 | 1/2021 |
| DE | 102019127583 | A1 | 4/2021 |
| EP | 1953896 | A1 | 8/2008 |
| JP | 2009303293 | A | 12/2009 |
| JP | 2012139074 | A | 7/2012 |
| JP | 2013017297 | A | 1/2013 |
| JP | 2016054608 | A | 4/2016 |

* cited by examiner

ROTOR FOR AN ELECTRIC MACHINE

CROSS REFERENCE TO RELATED APPLICATIONS

This application claims benefit to German Patent Application No. DE 10 2023 103 617.3, filed on Feb. 15, 2023, which is hereby incorporated by reference herein.

FIELD

The invention relates to a rotor for an electric machine and a method for producing the rotor according to the invention.

BACKGROUND

Various rotor topologies are presented in the prior art for electric machines, in particular for use in motor vehicles. A rotor topology with so-called buried magnets, which are provided in pockets or cavities within a rotor core, has proven to be advantageous with regard to efficiency.

FIGS. 1*a* and 1*b* show schematic views of such a rotor topology known from the prior art. FIG. 1*a* shows a perspective view of the embodiment, while FIG. 1*b* shows a cross-sectional view perpendicular to a rotor longitudinal axis x of the same embodiment in a detailed view. The rotor 1 comprises a rotor shaft 2 oriented along the rotor axis x. An inner sheet package 11 is arranged on the rotor shaft 2, which has a star-shaped cross-section (perpendicular to the rotor longitudinal axis x). In the recesses of the star-shaped cross-section, buried magnets 41 are arranged in a v-shape, wherein the inner sheet package 11 comprises corresponding pockets and cut-outs for receiving the buried magnets 41 at the corresponding positions. These are then fixed to the corresponding positions with a casting compound 50.

In the recesses of the star-shaped cross-section of the inner sheet package 11, outer sheet packages 12 are arranged in the radial direction starting from the rotor shaft 2 on the buried magnets 41, which in turn receive surface magnets 42 in recesses provided for this purpose. A rotor pole 1*a* is located at the positions where the surface magnets 42 are arranged, so that the embodiment shown in FIGS. 1*a* and 1*b* has six rotor poles 1*a*. A rotor drum 30 is arranged in the radial direction of the rotor 1 on the very outer side, which surrounds the rotor 1 along the circumference and holds the sheet packages 11, 12 and the magnets 41, 42 together even at high revolutions and the resulting large centrifugal forces. The rotor drum 30 can be composed of different segments. In addition, cavities 13 can be provided in the sheet packages 11, 12 for heat dissipation (cooling) and for reducing the mass.

The sheet packages 11, 12 are made up of individual sheets, which are connected to one another. The inner sheet package 11 can be composed of a plurality of individual packages, which are connected to one another in either the circumferential direction or the longitudinal direction of the rotor 1. In the context of the application, however, only an inner sheet package 11 is referred to and in the process, it is not differentiated whether it was composed of different segments or individual packages or only the corresponding cut-out sheets were connected to one another. The magnets 41, 42 can also be produced from a plurality of individual magnets, which together form a magnetic unit or consist only of a single magnet. In the context of this application, both variants are subsumed under the term "magnet".

In the development of electric motors, attention is paid to cooling, i.e., the heat dissipation from the sheet packages and the rotor. For this purpose, patent specification DE 10 2017 124 471 A1 discloses a rotor with encapsulated permanent magnets, wherein cooling channels are located in the casting compound. The cooling medium is moved from the radial inside to the radial outside of the rotor using centrifugal force.

The patent document JP 2012 139 074 A also discloses a rotor with cast permanent magnets, wherein cooling channels are located in the casting compound. A similar arrangement is also known from the patent document JP 2013 017 297 A, wherein a cooling channel is configured in a magnetic pocket specially formed for this purpose, which is sealed to the sheet package by a casting compound. The cooling medium is in direct contact with the magnet on one side.

Patent specification DE 10 2012 204 782 A1, JP 2016 054 608 A and DE 10 2009 025 929 A1 also disclose rotors with permanent magnets and cooling channels.

SUMMARY

In an embodiment, the present disclosure provides a rotor for an electric machine comprising at least one inner sheet package arranged on a rotor shaft defining a rotor longitudinal axis and buried magnets arranged radially around the at least one inner sheet package, which are arranged in a radial direction between the inner sheet package and correspondingly arranged outer sheet packages and are fixed by a casting compound. The rotor further comprises a plurality of surface magnets arranged on the outer sheet packages, wherein each surface magnet forms a rotor pole in conjunction with a respective outer sheet package of the outer sheet packages on which it is arranged and at least one of the buried magnets. At least one cooling channel extending along the rotor longitudinal axis is arranged in at least one of the inner or outer sheet packages and is sealed by a casting compound in a medium-tight manner against the at least one of the inner or outer sheet packages in which it is located.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Figure 1A:
FIG. 1*a* illustrates a schematic perspective view of a rotor 1 of an electric machine according to the prior art.
Figure 1A:
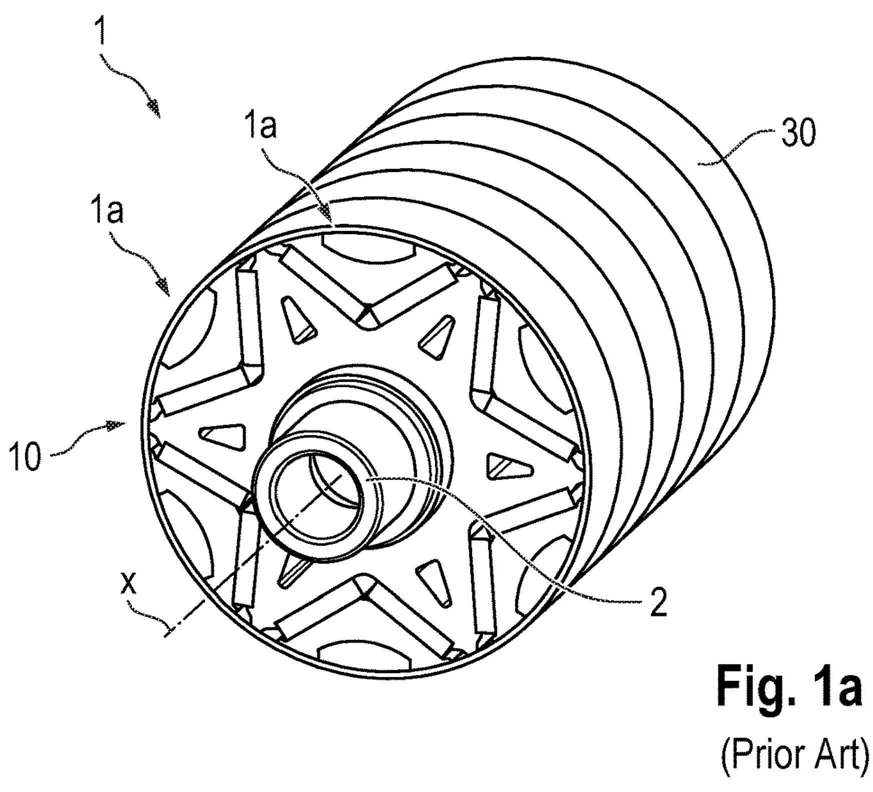

In an embodiment, the present invention provides a rotor for an electric machine, which has an alternative option for cooling the rotor. A method for producing the rotor according to embodiments of the invention is also provided. An electric machine comprising the rotor according to embodiments of the invention can be provided for use as a vehicle drive in a motor vehicle. Such an electric machine can thereby be used as an electric motor as well as an electric generator.

The rotor for an electric machine according to an embodiment of the invention comprises at least one inner sheet package arranged radially around a rotor shaft defining a rotor longitudinal axis, wherein buried magnets are arranged radially around the inner sheet package, which are arranged in a radial direction between the inner sheet package and correspondingly arranged outer sheet packages and fixed by a casting compound. Furthermore, the rotor according to an embodiment of the invention comprises a plurality of surface magnets, which are arranged on the outer sheet packages, preferably in recesses provided for this purpose in the outer sheet packages. Each surface magnet defines a rotor pole in conjunction with an outer sheet package on which it is arranged and at least one buried magnet. Preferably, a rotor drum surrounding the sheet packages and surface magnets in the circumferential direction is provided. According to an embodiment of the present invention, at least one cooling channel is arranged in at least one sheet package, which extends along the rotor longitudinal axis and is sealed against the sheet package in which it is located by a casting compound preferably made of plastic in a media-type manner. The cooling channel is preferably completely surrounded by the sheet package. Furthermore, preferably, the casting compound in the cooling channel corresponds to the casting compound for fixing the buried magnets. In the context of this application, the term "sealed against the sheet package in a media-tight manner" means that no medium, such as in particular a cooling liquid, can escape from the cooling channel in its radial direction and thus penetrate into the sheet package. The casting compound is therefore to be understood as a seal for the cooling channel.

A cooling medium can therefore flow through the configured cooling channel, which absorbs heat from the rotor and removes it from the rotor. Cooling can therefore reduce the temperature of the magnets and the sheet packages, which has a positive effect on the efficiency of the motor and in particular its continuous performance and the service life of the magnets and therefore the motor. The resulting improved thermal connection of the magnets to the cooling system can also be used in particular to deploy magnets with a lower proportion of heavy rare earths. These are less temperature stable.

In an advantageous embodiment of the invention, the cooling channel is configured to direct a cooling medium, in particular a cooling liquid, from a first balancing disk to a second balancing disk of the rotor, wherein the balancing disks are arranged on two opposite faces of the rotor in the direction of the rotor longitudinal axis. In other words, the cooling channel represents a continuous connection of the two end faces of the rotor, such that a cooling medium can enter on the one end face of the rotor and exit on the opposite end face, such that the two balancing disks are fluidically connected to each other. In this way, it can be ensured that the magnets, which also extend along the rotor longitudinal axis, are fully cooled in order to thus increase the effect of cooling.

In an advantageous embodiment of the invention, the first balancing disk comprises at least one cooling channel inlet configured to receive a cooling medium and direct it into the at least one cooling channel, and the second balancing disk comprises a cooling channel outlet configured to collect the cooling liquid from the cooling channel and discharge it from the rotor. Thus, the cooling medium enters one side of the rotor in the direction of the rotor longitudinal axis, is heated by the rotor heat and exits the other side of the rotor. In this way, a high cooling capacity can be ensured. In an embodiment, two cooling channels are provided, wherein the one cooling channel conveys a cooling medium from one direction to the other, and the other cooling channel conveys a cooling medium in the opposite direction, such that both balancing disks have both a cooling channel inlet and a cooling channel outlet. Preferably, the balancing disks have at least one radially outwardly extending cooling channel per rotor pole, such that the cooling medium is distributed in the balancing disk in a star shape from the inside out.

In an embodiment of the invention, the rotor comprises at least two cooling channels, wherein a balancing disk has a cooling channel inlet and a cooling channel outlet, and furthermore the second balancing disk has a cooling medium guide, which is configured to transfer the cooling medium from one cooling channel to another cooling channel of the rotor. In this way, the cooling medium is guided through the rotor twice, allowing it to absorb more heat and reducing the amount of cooling medium required. The cooling channel inlet and the cooling channel outlet are arranged on the same balancing disk.

In an advantageous embodiment of the invention at least one cooling channel is arranged in at least one outer sheet package. As the outer sheet packages are located between the surface magnets and the buried magnets, the heat load is greatest here, whereby cooling by means of the cooling channel has the greatest effect.

In an embodiment of the invention, at least one cooling channel is arranged in at least one inner sheet package.

Furthermore, in addition to at least one cooling channel in the sheet packages, at least one further cooling channel is arranged in the casting compound for fixing the buried magnets. In this way, the heat dissipation from the rotor can be further increased, thus increasing the cooling capacity.

In an embodiment of the invention, the casting compound in the at least one cooling channel in the sheet packages has a thickness of between 0.2 mm and 0.5 mm. With such a wall thickness, sufficient media tightness of the cooling channel can be ensured, wherein the cross-section of the cooling channel is not constricted too much at the same time. In addition, a sufficiently high heat transfer from the sheet packages to the cooling medium is ensured with such a thickness of the casting compound in this area.

In an embodiment of the invention, the at least one cooling channel in a sheet package has a trapezoidal, preferably additionally symmetrical, cross-section. In an embodiment, one side of the trapezoid is shorter than the other. Preferably, this is an embodiment in which the shorter side of the trapezoid faces outwards in the radial direction of the rotor. Such a cross-sectional shape can ensure that the guidance of the magnetic flux in the sheet packages is influenced as little as possible.

The method according to an embodiment of the invention for producing a rotor comprises several steps. First, an inner sheet package and a number of outer sheet packages corresponding to the number of poles are provided for this purpose. The provision comprises cutting out the sheets and assembling them into the corresponding sheet packages. According to a further method step, at least one cooling channel is cut into the inner sheet package and/or the outer sheets package in the finished sheet packages or in the individual sheets. The method step of cutting out the cooling channel can therefore take place during the method step of preparing the sheet packages when the cooling channel is cut out in the individual sheets and the sheets are subsequently brought together to form a sheet package. The cooling channel is cut out in such a way that the cooling channel, when assembled, directs a cooling medium from one end face of the rotor to an opposite end face of the rotor in the direction of the rotor longitudinal axis. Furthermore, the sheet packages are arranged together with buried magnets and surface magnets on a rotor shaft, such that the buried magnets are positioned between the inner sheet package and the outer sheet packages, and the surface magnets are arranged on the outer sheet packages. In a further method step, a rotor drum is preferably arranged around the sheet packages and the surface magnets, such that the rotor drum surrounds the sheet packages and the surface magnets in the circumferential direction. Furthermore, the buried magnets are fixed in their positions by a casting compound. Furthermore, the at least one cooling channel is lined with a casting compound. This should be understood to mean that the cooling channel is sealed from the sheet packages by the casting compound in a media-tight manner, such that a cooling medium flowing through the cooling channel does not enter the sheet packages. The casting compound used for this purpose preferably corresponds to the casting compound which is also used to fix the buried magnets.

An embodiment of the method according to the invention further comprises the method step according to which at least one further cooling channel is formed in the casting compound for fixing the buried magnets. In this way, the cooling effect can be further improved.

At this point, it should be noted that the embodiments of the device, i.e., the rotor, which are considered as advantageous embodiments, are hereby disclosed as preferred embodiments of the method according to the invention. Thus, the explained embodiments regarding the design of the cooling channel or the placement of the cooling channel as well as regarding the design of the balancing disks are also disclosed as corresponding advantageous embodiments of the method according to the invention.

In the following, advantageous aspects and embodiments of the invention will now be explained in further detail with reference to the accompanying figures.

Figure 1B:
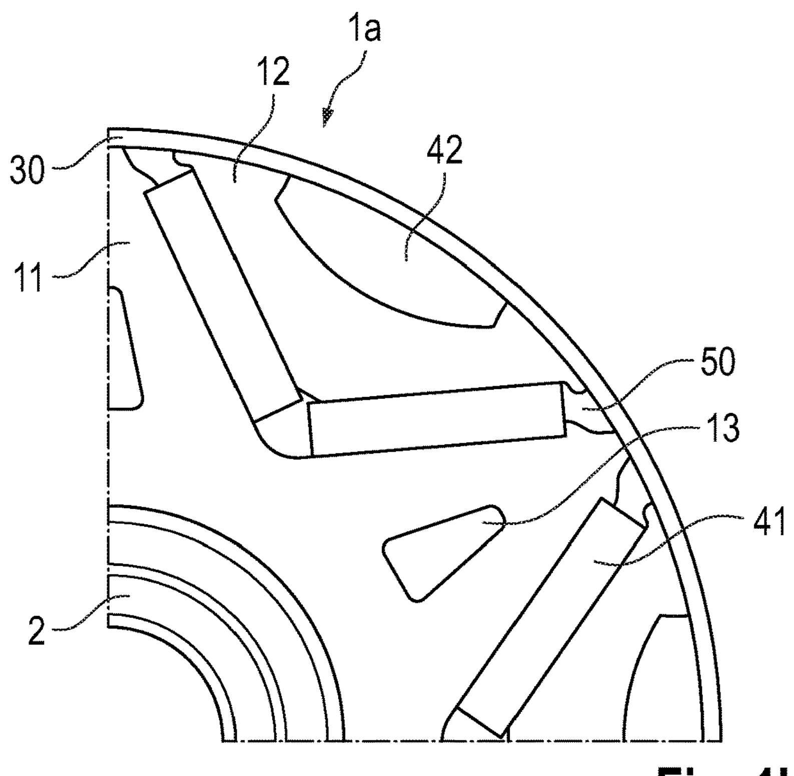
FIG. 1*b* illustrates a detailed view of the electric machine shown in FIG. 1*a* in a cross-section perpendicular to the rotor longitudinal axis x.

FIGS. 1*a* and 1*b* have already been discussed in further detail in the description of the prior art, for which reason at this point a further description of the figures will be omitted.

Figure 2:
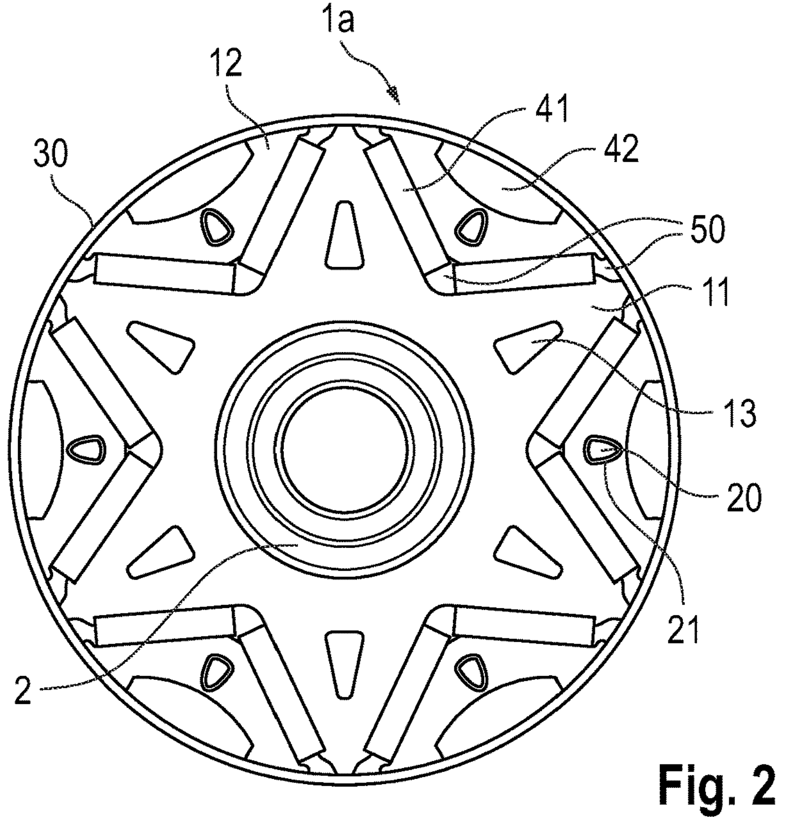
FIG. 2 illustrates a cross-sectional view perpendicular to the rotor longitudinal axis x of a rotor according to an embodiment of the invention.

FIG. 2 shows a cross-sectional view perpendicular to the rotor longitudinal axis x of a first embodiment of the rotor 1 according to an embodiment of the invention. The rotor topology of the rotor 1 corresponds substantially to the rotor topology of the rotor 1 described in view of FIGS. 1*a* and 1*b*. Thus, only the differences are discussed at this point.

In contrast to the rotor 1 shown in FIGS. 1*a* and 1*b*, the embodiment of a rotor 1 according to an embodiment of the invention according to FIG. 2 has six cooling channels 20, which extend along the rotor longitudinal axis x (see FIG. 1*a*) through the rotor 1 from one end face to the other end face of the rotor 1. A cooling channel 20 is provided on each rotor pole 1*a*, which is cut into the corresponding outer sheet package 12 of the respective rotor pole 1*a*. According to the method according to an embodiment of the invention, the cooling channels 20 are already cut into the outer sheet packages 12 during cutting out (preparation, e.g., punching) or during cutting out the of individual sheets.

The cooling channel 20 comprises a sealing layer 21 arranged on the cooling channel wall and made of a casting compound 50. This preferably has a thickness of between 0.2 mm and 0.5 mm and seals the cooling channel 20 against the corresponding outer sheet packages 12 in a media-tight manner. Thus, a cooling medium directed through the cooling channels 20 cannot penetrate into the sheet packages 12.

The cooling channels 20 further have a trapezoidal cross-section, wherein the sides of the trapezoid are rounded. In the context of this application, a trapezoidal cross-section is thus also to be understood as a trapezoid with round sides and rounded corners. The trapezoid has a long side and a short side and is also symmetrical. The legs connecting the sides of the trapezoid are the same length and also rounded. Since the cooling channels 20 have a different magnetic resistance than the outer and inner sheet packages 11, 12, this affects the guidance of the magnetic flux. By means of a described cross-sectional shape of the cooling channels 20, it can be ensured that the guidance of the magnetic flux through the outer sheet packages 12 through the cooling channels is influenced as little as possible. Other cross-sectional shapes, such as oval, circular, triangular, rounded triangular, can also be provided, wherein the shape is preferably adapted to the position of the corresponding cooling channel 20.

Figure 3:
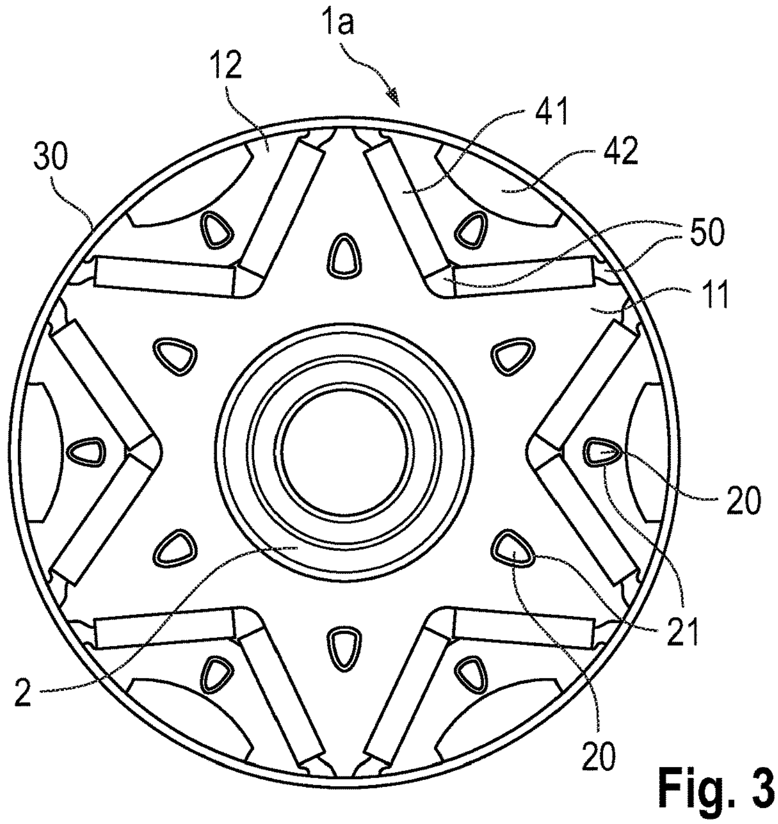
FIG. 3 illustrates a cross-sectional view perpendicular to the rotor longitudinal axis x of a rotor according to an embodiment of the invention.

FIG. 3 shows an embodiment of a rotor 1 according to the invention, wherein the view corresponds to that of FIG. 2. The embodiment according to FIG. 3 corresponds to the embodiment according to FIG. 2 as far as possible, therefore only the differences between the two embodiments are discussed at this point.

In contrast to the embodiment shown in FIG. 2, the embodiment according to FIG. 3 has further cooling channels 20 in the inner sheet package 11 instead of the cavities 13. These are shaped the same as the cooling channels 20 in the outer sheet packages 12 and also have a corresponding sealing layer 21 made of a casting compound 50. The cooling channels 20 in the inner sheet package 11 are arranged offset to the cooling channels 20 in the outer sheet packages 12, and are thus positioned in the triangular jets of the star-shaped cross-section of the inner sheet package 11 between the buried magnets 41 of two rotor poles 1*a*. With the embodiment shown, the cooling capacity can be significantly improved compared to the embodiment according to FIG. 2 and the temperature is kept constant in both the outer sheet packages 12 and the inner sheet package 11.

Figure 4:
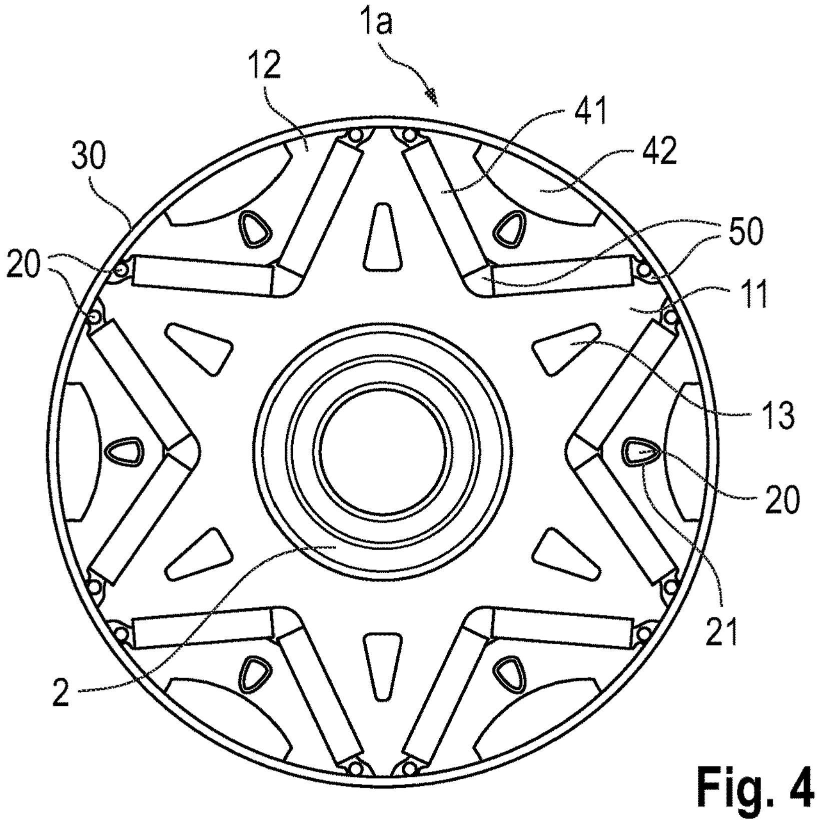
FIG. 4 illustrates a cross-sectional view perpendicular to the rotor longitudinal axis x of a rotor according to an embodiment of the invention.

FIG. 4 shows an embodiment of a rotor 1 according to the invention, wherein the view corresponds to that of FIG. 2. The embodiment according to FIG. 4 corresponds to the embodiment according to FIG. 2 as far as possible, therefore only the differences between the two embodiments are discussed at this point.

In contrast to the embodiment shown in FIG. 2, the embodiment according to FIG. 4 has further cooling channels 20 in the casting compound 50 at the radially outer end of the rotor 1 upstream of the rotor drum 30 for fixing the buried magnets 41. The additional cooling channels 20 can thereby ensure better cooling of the rotor 1 and thus further increase the cooling capacity. In the embodiment shown, the cooling channels 20 have a round cross-sectional shape, although other cross-sectional shapes can also be provided.

Figure 5:
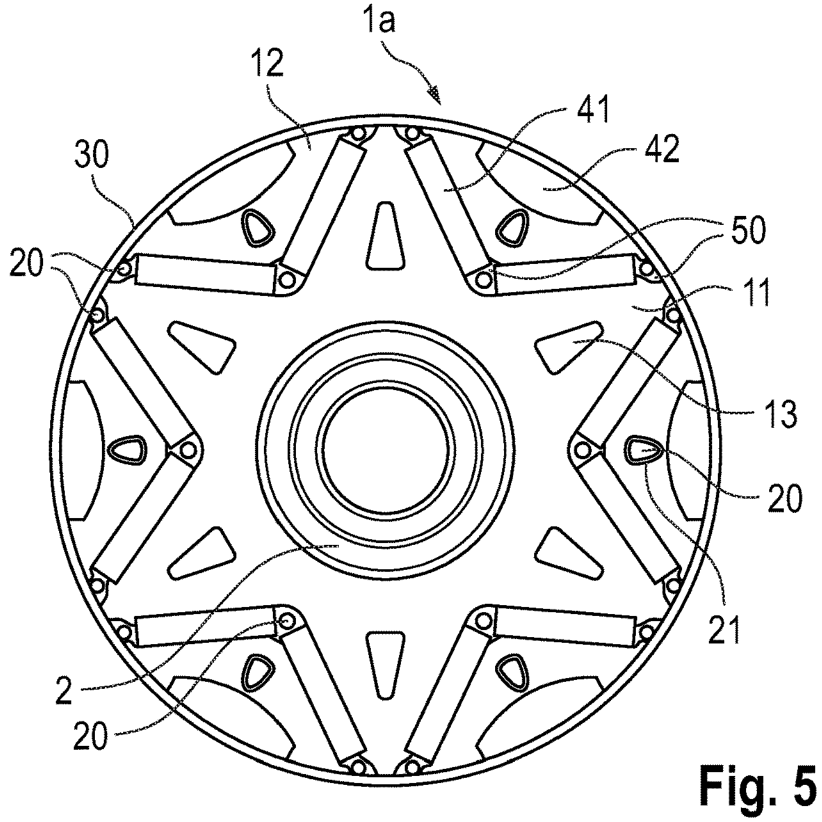
FIG. 5 illustrates a cross-sectional view perpendicular to the rotor longitudinal axis x of a rotor according to an embodiment of the invention.

FIG. 5 shows an embodiment of a rotor 1 according to the invention, wherein the view corresponds to that of FIG. 4. The embodiment according to FIG. 5 corresponds to the embodiment in accordance with FIG. 4 as far as possible, wherein only further cooling channels 20 are provided in the casting compound 50 for fixing the buried magnets 41. These cooling channels 20 are arranged between two buried magnets 41 of a rotor pole 1*a* arranged in a v-shape. In this way, the cooling performance can be further improved.

It should be noted that any combination of the embodiments shown according to FIGS. 2 to 5 are also within the scope of the invention.

Figure 6:
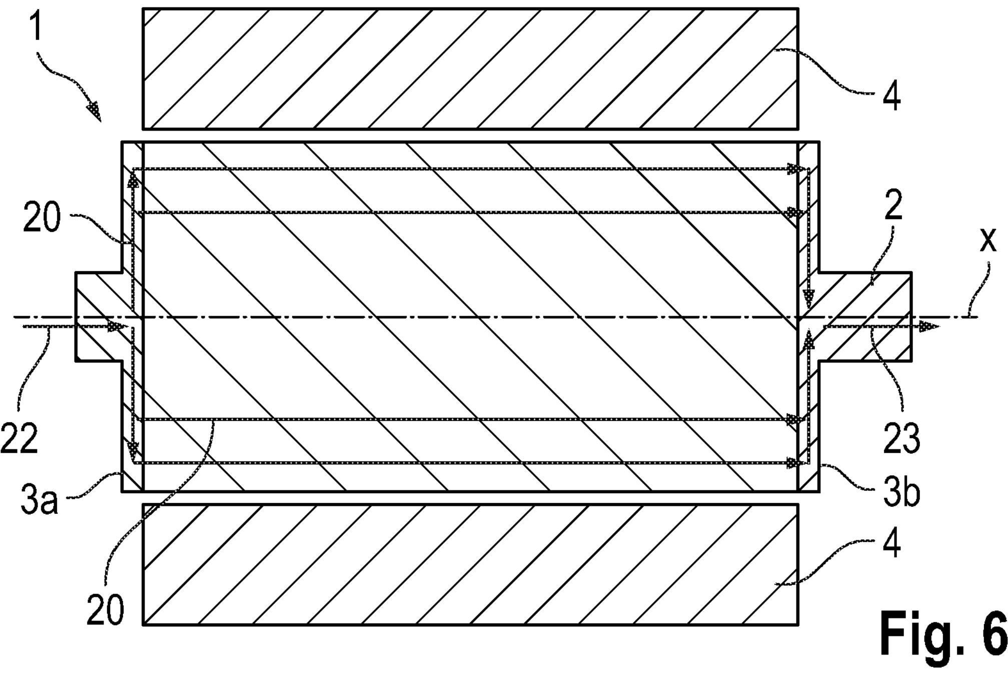
FIG. 6 illustrates a cross-sectional view along the rotor longitudinal axis x of a rotor according to an embodiment of the invention.

FIG. 6 shows an embodiment of the rotor 1 according to the invention. FIG. 6 shows a rotor 1 according to an embodiment of the invention with at least four cooling channels 20, which are shown in cross-section in the rotor longitudinal direction x. Two cooling channels 20 are arranged radially further inside the rotor 1 than two further cooling channels 20, wherein the rotor 1 is symmetrical in relation to the rotor longitudinal axis x. The rotor 1 rotates in a stator 4 and has a first balancing disk 3*a* on one end face and a second balancing disk 3*b* on the opposite end face.

The first balancing disk 3*a* comprises a cooling channel inlet 22. A cooling medium flows into the rotor 1 through the cooling channel input 22 and is distributed to the cooling channels 22. The second balancing disk 3*b*, on the other hand, has a cooling channel outlet 23 and collects the cooling medium directed through the cooling channels 20 and guides it out of the rotor 1. It is also possible to reverse the flow direction of the cooling medium and thus arrange the cooling channel inlet 22 in the second balancing disk 3*b* and, correspondingly, the cooling channel outlet 23 in the first balancing disk 3*a*.

It should be noted that such a guidance of the cooling medium could be implemented, for example in one of the embodiments according to FIG. 2, 3, 4 or 5.

An embodiment is also provided in which both the first balancing disk 3*a* and the second balancing disk 3*b* each have a cooling channel inlet 22 and a cooling channel outlet 23 and thus the cooling medium is guided through the rotor 1 in different cooling channels 20 in opposite directions. In this way, uniform cooling of the rotor 1 could be ensured.

Figure 7:
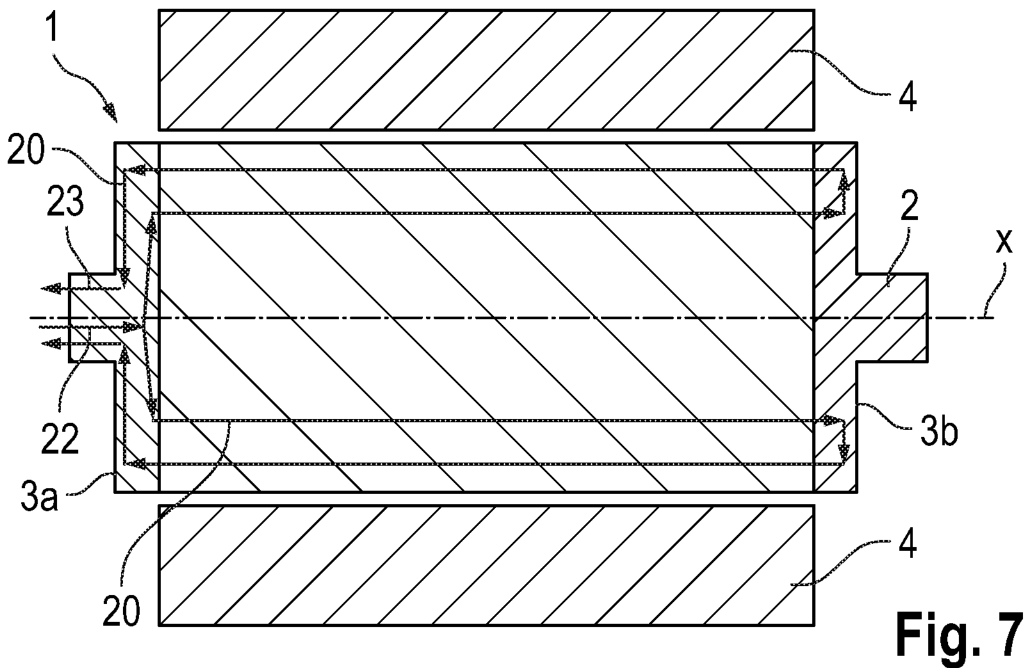
FIG. 7 illustrates a cross-sectional view along the rotor longitudinal axis x of a rotor according to an embodiment of the invention.

FIG. 7 shows an embodiment of a rotor 1 according to the invention, wherein the view corresponds to that of FIG. 6. The embodiment according to FIG. 7 corresponds to the embodiment according to FIG. 6 as far as possible, therefore only the differences between the two embodiments are discussed at this point.

In contrast to the embodiment shown in FIG. 6, the first balancing disk 3*a* in the embodiment according to FIG. 7 comprises both the cooling channel input 22 and the cooling channel output 23. The cooling medium is therefore introduced into the first balancing disk 3*a* and introduced on two of the four cooling channels 20 in the sheet packages 11, 12. The second balancing disk 3*b* has a cooling medium guide, which receives the cooling medium from the two filled cooling channels 20 and directs it into the two other cooling channels 20, whereby the cooling medium is guided back to the first balancing disk 3*a* and is discharged again there through the cooling channel outlet 23.

The cooling medium is therefore passed twice through the rotor 1 and can therefore absorb a greater amount of energy in the form of heat. In this way, less cooling medium needs to be used to dissipate heat. In addition, the embodiment is suitable for installation situations of the rotor in which the coolant can only be supplied and discharged from one side of the rotor. It should be noted at this point that this embodiment of the cooling medium guide can also be applied to the embodiments according to FIGS. 2, 3, 4 and 5.

Which of the two embodiments of the cooling medium guide shown in FIGS. 6 and 7 is better depends on the heat output to be dissipated and the design of the cooling channels 20. Based on the embodiment shown in FIG. 6, more heat can be dissipated due to the greater temperature difference between the cooling medium and the rotor if it is assumed that the cooling channels 20 individually and the sum of the cooling channels 20 can carry the same amount of cooling medium. However, such an embodiment results in an uneven heat transfer to the cooling medium, as the temperature difference in the inlet area of the cooling channels 20 is greater than in the outlet area of the cooling channels, as the longer the cooling medium remains in the cooling channel 20, the more heat is absorbed by the cooling medium and therefore the temperature difference between the sheet package decreases.

However, according to the embodiment of the cooling medium guide shown in FIG. 7, a lower amount of cooling medium can be used, which is advantageous when used in a motor vehicle as less mass must be transported.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A rotor for an electric machine comprising:

at least one inner sheet package arranged on a rotor shaft defining a rotor longitudinal axis;

buried magnets arranged radially around the at least one inner sheet package, which are arranged in a radial direction between the inner sheet package and correspondingly arranged outer sheet packages and are fixed by a casting compound;

a plurality of surface magnets arranged on the outer sheet packages, wherein each surface magnet forms a rotor pole in conjunction with a respective outer sheet package of the outer sheet packages on which it is arranged and at least one of the buried magnets; and at least one cooling channel extending along the rotor longitudinal axis is-arranged in at least one of the inner or outer sheet packages and sealed by a compound having the same composition as the casting compound in a medium-tight manner against the at least one of the inner or outer sheet packages in which it is located such that the at least one cooling channel is fully sealed from the at least one inner or outer sheet packages, wherein the at least one cooling channel is arranged separately from gaps between the at least one inner and outer sheet packages configured to receive the buried magnets.

2. The rotor according to claim 1, wherein the cooling channel is configured to direct a cooling liquid from a first balancing disk to a second balancing disk of the rotor, wherein the first and second balancing disks are arranged on two opposite end faces of the rotor.

3. The rotor according to claim 2, wherein the first balancing disk comprises a cooling channel inlet, which is configured to receive a cooling liquid and to direct it into the at least one cooling channel, and the second balancing disk comprises a cooling channel outlet, which is configured to collect the cooling liquid from the cooling channel to discharge it from the rotor.

4. The rotor according to claim 2, wherein the rotor comprises at least two cooling channels and the first balancing disk comprises a cooling channel inlet, configured to receive and direct a cooling liquid into at least one cooling channel, and a cooling channel outlet, configured to collect the cooling liquid from one of the at least two cooling channels to discharge it from the rotor, and wherein the second balancing disk comprises a cooling liquid guide, which is configured to transfer the cooling liquid from one of the at least two cooling channels to another of the at least two cooling channels of the rotor.

5. The rotor according to claim 1, wherein the at least one cooling channel is arranged in at least one of the outer sheet packages.

6. The rotor according to claim 1, wherein the at least one cooling channel is arranged in the at least one inner sheet package.

7. The rotor according to claim 1, wherein the compound in the at least one cooling channel has a thickness of between 0.2 mm and 0.5 mm.

8. The rotor according to claim 1, wherein the at least one cooling channel in at least one sheet package of the inner and outer sheet packages has a symmetrical trapezoidal cross-section, wherein one side of the trapezoid is smaller than the other.

9. A method for producing the rotor according to claim 1, the method comprising:

providing at least one inner sheet package and providing outer sheet packages;

cutting out at least one cooling channel in the at least one inner sheet package and/or the outer sheet packages, such that the cooling channel, when assembled, directs a cooling medium from an end face of the rotor to an opposite end face of the rotor;

arranging the at least one inner sheet package and outer sheet packages together with buried magnets and surface magnets on a rotor shaft such that the buried magnets are positioned between the at least one inner sheet package and the outer sheet packages and the surface magnets are arranged on the outer sheet packages;

fixing the buried magnets with a casting compound; and lining the at least one cooling channel with the casting compound.

10. The method according to claim 9, further comprising forming a further cooling channel in the casting compound for fixing the buried magnets.

11. The rotor according to claim 1, comprising a further cooling channel arranged in the casting compound fixing at least one of the buried magnets.

12. The rotor according to claim 11, wherein the further cooling channel is fully surrounded by the casting compound such that the cooling channel is fully sealed from the at least one inner sheet package and the at least one outer sheet package.

13. The rotor according to claim 12, wherein the further cooling channel is arranged in a vertex of a V-shape formed by two of the buried magnets.

14. The rotor according to claim 13, wherein the casting compound is also arranged at each radially outermost end of the V-shape, and where a second further cooling channel is arranged in the casting compound at each of the radially outermost ends of the V-shape.

15. The rotor according to claim 13, wherein one of the at least one cooling channels is arranged between the further cooling channel and one of the plurality of surface magnets in a radial direction.

16. The rotor according to claim 1, wherein the at least one inner or outer sheet package separates each of the at least one cooling channels from the gaps between the at least one inner and outer sheet packages.

17. The rotor according to claim 1, wherein pairs of the buried magnets each form a V-shape, and wherein each of the at least one cooling channels is arranged between one of the V-shapes and one of the plurality of surface magnets in a radial direction.

* * * * *